United States Patent [19]

Huang et al.

[11] Patent Number: 5,756,414
[45] Date of Patent: *May 26, 1998

[54] METHOD OF REGENERATING DEACTIVATED CATALYST

[75] Inventors: Yao-Jyh Robert Huang, Houston, Tex.; Shun Chong Fung, Bridgewater; Gary Brice McVicker, Califon, both of N.J.; Jar-lin Kao; John Francis Walsh, both of Houston, Tex.; Kenneth Ray Clem, Humble, Tex.

[73] Assignee: Exxon Research and Engineering Company, Florham Park, N.J.

[*] Notice: The term of this patent shall not extend beyond the expiration date of Pat. No. 4,935,819.

[21] Appl. No.: 940,579

[22] Filed: Sep. 4, 1992

Related U.S. Application Data

[63] Continuation-in-part of Ser. No. 709,154, Jun. 3, 1991, abandoned, which is a continuation of Ser. No. 432,221, Nov. 6, 1989, abandoned, which is a continuation of Ser. No. 205,567, Jun. 15, 1988, Pat. No. 4,925,819, which is a continuation of Ser. No. 814,027, Dec. 23, 1985, abandoned, which is a continuation of Ser. No. 550,951, Nov. 10, 1983, abandoned.

[51] Int. Cl.$^6$ .................. B01J 29/38; B01J 38/44; B01J 38/42; C10G 35/095

[52] U.S. Cl. ................... 502/37; 502/35; 208/140
[58] Field of Search ................... 502/37, 35, 36, 502/50, 51, 53; 208/140

[56] References Cited

U.S. PATENT DOCUMENTS

| | | | |
|---|---|---|---|
| 3,986,982 | 10/1976 | Crowsom et al. | 502/37 |
| 4,192,771 | 3/1980 | Burbidge et al. | 502/37 |
| 4,218,338 | 8/1980 | Huin et al. | 502/37 |
| 4,855,269 | 8/1989 | Mohr | 502/37 |
| 4,914,068 | 4/1990 | Cross et al. | 502/37 |
| 4,925,819 | 5/1990 | Fung | 502/37 |
| 5,106,798 | 4/1992 | Fung | 502/37 |
| 5,256,612 | 10/1993 | Fung | 502/37 |

Primary Examiner—Ponnathapura Achutamurthy
Attorney, Agent, or Firm—Edward F. Sherer

[57] ABSTRACT

The present invention is a process for regenerating deactivated catalyst or redispersing catalytic metal in a fresh catalyst comprising at least one Group VIII catalytic metal, zeolite, an inert binder. The process comprises coke burn, hydrogen reduction, catalyst conditioning, oxychlorination, low pressure stripping, and low pressure final hydrogen reduction.

23 Claims, No Drawings

METHOD OF REGENERATING DEACTIVATED CATALYST

CROSS-REFERENCE TO RELATED APPLICATION

This application is a Continuation-In-Part of U.S. Ser. No. 07/709,154 filed June 3, 1991, now abandoned which is a Continuation of U.S. Ser. No. 07/432,221, filed Nov. 6, 1989, now abandoned; which is a Continuation of U.S. Ser. No. 07/205,567, filed Jun. 15, 1988, which issued as U.S. Pat. No. 4,925,819; which is a Continuation of U.S. Ser. No. 814,027, filed Dec. 3, 1985, now abandoned; which is a Continuation of U.S. Ser. No. 550,951, filed Nov. 10, 1983, now abandoned, all disclosures of which are incorporated in their entireties by reference thereto herein.

1. Field of Invention

This present invention relates to regenerating deactivated zeolite based catalysts and enhancing the activity of fresh zeolite based catalysts. More particularly, the present invention is directed to methods for regenerating deactivated zeolite based reforming catalysts containing one or more Group VIII metals dispersed in the zeolite, specifically a large pore zeolite, and more specifically zeolite L.

2. Discussion of Background and Material Information

Compared to conventional alumina based reforming catalysts which are acidic and bifunctional, zeolite L based catalysts are non-acidic and monofunctional. This functionality difference imparts advantages in reforming light naphtha to zeolite based reforming catalysts compared to conventional alumina based reforming catalysts.

Zeolite based reforming catalysts deactivate and periodically must be regenerated to recover activity. Since filing the Fung et al. application improvements to the procedures taught in Fung been made. These improvements over Fung are the subject of the present Continuation-in-Part.

Catalytic reforming is a major petroleum refining process used to raise the octane rating of naphthas (C6 to C11 hydrocarbons) for gasoline blending. Catalytic reforming is also a principal source of aromatic chemicals, i.e., benzene, toluene and xylenes, via conversion of paraffins and naphthenes to aromatics.

The principal reforming chemical reactions are dehydrogenation of cyclohexane to aromatics, dehydrocyclization of paraffins to aromatics, dehydroisomerization of alkylcyclopentanes to aromatics, isomerization of normal paraffins to branched paraffins, dealkylation of alkylbenzenes, and hydrocracking of paraffins to light hydrocarbons. The hydrocracking of paraffins to light hydrocarbons is undesirable and should be minimized because light hydrocarbons have low value.

Reforming is typically carried out at temperatures of 800° F. to 1000° F., pressures of 50 psi to 3000 psi, hourly weight space velocities of 0.5 to 3.0, and in the presence of hydrogen at molar ratios to feed of 1 to 10.

Commercial reforming units include a plurality, e.g. three or four, adiabatic packed bed reactors containing different amounts of catalyst connected in series, commonly referred to as a reactor train. In conventional reforming processes, the naphtha feed is vaporized, mixed with hydrogen, and preheated in a furnace to a temperature within the range of about 800° F. to 1000° F. and fed into the inlet of the lead reactor. Since reforming is a net endothermic process, temperatures in reactors fall moving downstream. Temperatures of reactor effluents are typically below or in the lower end of the reforming temperature range of 800° F. to 1000° F., thus requiring that the reactor effluent streams be reheated in furnaces installed upstream of each of the reactors.

The product stream from the last downstream reactor is cooled and flashed to low pressure in a drum and separated into a liquid reformate stream which is rich in aromatics and a gas stream which is rich in hydrogen. Part of the hydrogen-rich stream is recycled into the feed stream to provide the hydrogen to feed ratio required for the process. Hydrogen is a by-product of reforming and the net hydrogen produced is removed as a gas stream from the flash drum and purified.

Catalysts currently used in commercial reformers include a Group VIII metal, such as platinum, or platinum plus a second catalytic metal, such as rhenium or iridium, dispersed on an alumina substrate. Typically, chlorine is incorporated on the alumina to add acid functionality. Alumina-based reforming catalysts are suitable for aromatizing $C_{8+}$ paraffins, but are less effective for aromatizing $C_6$ to $C_8$ paraffins because these catalysts hydrocrack more of the lighter paraffins to low value fuel gas than they convert to aromatics.

Conventional commercial catalysts are bifunctional, i.e., the catalysts enhance i) dehydrogenation and cyclization reactions on the catalytic metal sites; and ii) isomerization on separate strong acid sites in the catalyst. The undesirable hydrocracking reactions also occur on the acid sites.

Within the past few years reforming catalysts have been developed which are effective for aromatizing the $C_6$ to $C_8$ paraffin components of naphtha. These catalysts are made using zeolite, rather than alumina, as the support for the catalytic metal. They are mono-functional and contain relatively few strong acid sites. Unlike conventional bifunctional catalysts, zeolite based catalysts accomplish dehydrogenation and cyclization reactions as well as isomerization on the dispersed metallic catalytic sites. Because these zeolite-based catalysts have few strong acid sites, undesirable hydrocracking reactions are repressed. Large pore zeolites are preferred for reforming catalysts, i.e. zeolites with a 6 to 15 Angstrom pore diameter. Suitable large pore zeolites for purposes of the present invention include zeolite X, Y, and L, with zeolite L being the most preferred support for reforming catalysts, particularly wherein the catalytically active metal is platinum.

For commercial reforming processes, zeolite catalysts are preferably formed into aggregates, such as extrudates or tablets, typically 1/32 to 1/4 inches in size to reduce pressure drop.

During reforming, catalysts deactivate due to accumulation of coke deposits in the catalyst, and agglomeration of the fine catalytic metal particles dispersed in the catalyst into larger particles. Therefore, it is common practice to periodically regenerate reforming catalysts to recover their activity. Unexpectedly, however, it was found that it is more difficult to regenerate the previously described zeolite-based reforming catalysts than the conventional alumina-based catalysts.

In general, such regeneration procedures include: 1) burning off the coke deposits using oxygen, and optionally a halogen or halogen containing compound, 2) redispersing the active catalytic metals by oxyhalogenation using, for example, HCl oxygen and water, 3) stripping excess halogen off the catalyst using first wet air, and then dry air as a stripping gas, and 4) reducing the dispersed catalytic metal using a reducing agent such as hydrogen.

In attempts to overcome problems experienced during regeneration of large-pore, zeolite-based reforming catalysts, various procedures have been developed, for example as disclosed in' U.S. Pat. Nos. 4,552,856, TAUSTER et al; 4,595,668, POEPPELMEIER et al; 4,595,669, FUNG et al; 4,595,670, TAUSTER et al; 4,634,517, TAUSTER et al; and 4,648,960, POEPPEIMEIER et al; the disclosures of which are hereby incorporated in their entirety herein by reference thereto.

U.S. Pat. No. 4,552,856, TAUSTER et al., relate to a process for the preparation of a dehydrocyclization catalyst including a type L zeolite having prescribed exchangeable cations and containing well dispersed particles of at least one group VII noble metal-loaded type L zeolite which, after being withdrawn from the loading solution and dried, may be calcined prior to being subjected to a hydrogen reduction step.

U.S. Pat. No. 4,568,658, POEPPEIMEIER et al.; U.S. Pat. 4,595,695, FUNG et al.; and U.S. Pat. No. 4,595,670, TAUSTER et al., attempt to improve the reforming characteristics of zeolite-based catalysts by improving the dispersion of catalytic metals in fresh catalysts, i.e., catalysts which have not been "put on oil", and which do not contain coke products, to increase the initial activity and selectivity of the fresh catalysts relative to its performance on oil.

U.S. Pat. No. 4,595,669, FUNG et al., commonly owned with the present application, which issued from U.S. Ser. No. 550,902 filed on Nov. 10, 1983 in the name of Shun C. Fung and Samuel Tauster, is directed to a process for improving the dispersion of noble metals by an oxychlorination procedure.

U.S. Pat. No. 4,634,517, TAUSTER et al., relates to a dehydrocyclization catalyst which is a type L zeolite including prescribed exchangeable cations and at least one Group VIII noble metal wherein at least about 90% of the noble metal is well dispersed in the form of particles having a diameter less than about seven Angstroms prior to reduction thereof.

U.S. Pat. No. 4,648,960, POEPPEIMEIER et al., is directed to a dehydrocyclization catalyst which is a type L zeolite having a prescribed amount of exchangeable cations and at least one Group VII noble metal particles at least 90% of which are well dispersed and have a diameter less than about 7 Angstroms.

U.S. Pat. No. 3,986,982, CROWSON et al.; U.S. Pat. No. 4,493,901, BERNARD et al.; U.S. Pat. No. 4,645,751, McCULLEN et al.; U.S. Pat. No. 4,851,380, Van LEIRSBURG et al.; U.S. Pat. No. 4,855,269, MOHR and U.S. Pat. No. 4,810,683, COHN et al. are directed to regeneration of zeolite-based catalysts.

U.S. Pat. No. 3,986,982, CROWSON et al., discloses that oxidative burn-off to remove carbonaceous deposits should be performed in a manner which controls water produced from the hydrogen present in the deposits, or added, by drying the inert gas when the inert gas is recycled so as to effect a water content of the gas at the inlet which is below 200 ppm volume.

U.S. Pat. No. 4,493,901, BERNARD et al., discloses that the selectivity of regenerated zeolite-based aromatization catalysts may be improved by adding a quantity of water up to about 10% by weight with respect to the catalyst to the air used to cool the catalyst after the oxychlorination step.

U.S. Pat. No. 4,645,751, McCULLEN et al., is directed to regeneration of deactivated noble metal containing zeolite catalysts which involves initially reducing the deactivated catalyst in hydrogen, pretreating the thus reduced catalyst with an inert gas stream containing about 0.001 to 10 weight percent hydrogen chloride, redispersing the noble metal with an inert gas stream containing about 0.001 to 10 weight percent Cl in the form of $Cl_2$ or Cl- containing organic material, and subsequently reducing the catalyst. It is disclosed that the Cl treatments may optionally occur in the presence of oxygen or sources of oxygen.

U.S. Pat. No. 4,851,380, VAN LEIRSBURG et al., is directed to a process for regenerating sulfur contaminated reforming catalysts composed of a zeolite and Group VIII metal which involves intentionally agglomerating the Group VIII metal into large agglomerates and then treating the catalyst with a halogen acid gas to remove sulfur contaminants.

U.S. Pat. No. 4,855,269, MOHR, is directed to a process for regenerating contaminated monofunctional, large- pore zeolite catalysts, formed and bound using an inorganic binder, which involves: (a) contacting the catalyst under oxychlorinating conditions with a gas comprising 1% to 21% oxygen, 1% to 4% water, and an effective amount of chlorine atoms to achieve a chlorine to platinum ratio between 4:1 and 1000:1; (b) contacting the catalyst with a gas comprising nitrogen, for a time between 150 and 1500 GHSV, and at a temperature between 850° and 950° F.; and (c) contacting the catalyst with a gas comprising hydrogen having less than 1000 ppm water, at a temperature between 800° F. and 950° F. and a gas rate between 150 and 1500 GHSV.

U.S. Pat. No. 4,810,683, COHN et al., discloses that the activity of non-acidic, zeolite-based Group VIII metal catalysts which have become deactivated, in part due to the deposition of carbonaceous materials, may be restored by subjecting the deactivated catalyst to a procedure which involves a first step of contacting the deactivated catalyst with a gaseous stream comprising oxygen, a halogen, or a halogen-containing compound or a mixture thereof, and an inert component at regeneration conditions including a temperature of from 350° C.–600° C. sufficient to combust at least a portion of said carbonaceous materials for a first period of time. This first step is followed by the second step of reducing the catalyst by contacting the catalyst with a gaseous stream comprising hydrogen at an elevated temperature for a period of time sufficient to produce a reduced/regenerated hydrocarbon conversion catalyst.

French Patent Publication 2,360,540 filed Sep. 9, 1981, BERNARD et al., teaches that catalyst regeneration is improved by subjecting the catalyst after oxychlorination to a treatment with water and cooling air before the catalyst is reduced.

French Application No. 8,000,114, BERNARD, discloses a hydrogen regeneration technique.

In addition to these patents, procedures are disclosed in commonly owned U.S. Pat. No. 4,925,819 which issued on May 15, 1990 from Ser. No. 205,567 Filed Jun. 15, 1988 entitled to an effective filing date of earlier filed related U.S. Ser. No. 550,951, FUNG et al., filed Nov. 10, 1983, for improving the activity and selectivity of deactivated type L zeolite-based catalysts by dispersing the catalytic metal throughout the pores or channels of the zeolite.

European Patent Application No. 0 142 352, FUNG et al., claims the priority of previously mentioned U.S. Ser. No. 550,951 and is similarly directed to the process of regenerating a deactivated catalyst or enhancing the activity of a fresh catalyst wherein FUNG et al., in EPA No. 142,352, also disclose that a wet nitrogen stripping step at temperatures no greater than about 450° C. may be performed between the previously mentioned steps of post treating with oxygen and reducing with hydrogen.

U.S. Pat. No. 4,914,068 which issued Apr. 3, 1990 from U.S. Ser. No. 170,503 filed Mar. 21, 1988, in the name of FUNG et al. entitled "Process for the Dispersion of Group VIII metal in Large Pore Zeolite Catalysts", the disclosure of which is also hereby incorporated in its entirety herein by reference thereto, discloses the advantages of a reduction step practiced at a temperature sufficiently lower than the chlorination or oxychlorination step and the benefits of cooling the catalyst in the presence of oxygen before the reduction.

U.K. Patent No. 1,063,819, Esso Research and Engineering Co., is directed to methods relating to manufacture and regeneration of catalysts for hydrocracking process wherein the catalyst includes a platinum group metal, or compound, associated with a crystalline aluminosilicate zeolite base. The process is disclosed as involving contacting the catalyst with a non-reducing gas containing in the range of 0.2–5 vol. % halogen at treatment temperatures in the range of 650° F. to 1200° F. and preferably within the range of about 850° F. to about 1050° F., for about ½ to 24 hours, after which, for purposes of spent or partially spent catalyst, the catalyst is activated with a hydrogen stream at elevated temperatures within the range of about 400° F. to 800° F. which are preferably within the range of about 500° F. to 600° F.

U.S. Pat. No. 4,467,045, FUNG, is directed to a process for the redispersion of iridium-containing catalysts involving a low temperature hydrogen reduction step, i.e., from 190° C. up to about 250° C. after a coke-burn off which is disclosed as allowing for milder conditions during subsequent halogen redispersion.

U.S. Pat. No. 4,595,669, commonly owned with the present application, which issued from U.S. Ser. No. 550,902 filed on Nov. 10, 1983 in the name of Shun C. Fung and Samuel Tauster, the disclosure of which is also hereby incorporated in its entirety by reference herein thereto, is directed to a process for improving the dispersion of noble metals by an oxychlorination procedure.

SUMMARY OF THE INVENTION

The present invention is directed to a process for treating a reforming catalyst comprising zeolite and at least one Group VIII catalytic metal, which involves the steps of: a) introducing a flow of oxygen into a gas flow, including inert gas, to result in a first gaseous stream comprising inert gas and oxygen and subjecting the deactivated catalyst to the first gaseous stream under conditions and time effective to burn coke. During coke burn, the catalytic metals agglomerate; b) terminating the flow of oxygen while maintaining the gas flow including inert gas for a time sufficient to essentially eliminate oxygen from the gas flow, followed by introducing a flow of hydrogen into the gas flow to result in a second gaseous stream comprising an inert gas and hydrogen which is essentially devoid of oxygen, and exposing the catalyst with agglomerated catalytic metals to the second gaseous stream under reducing conditions for a time effective to reduce the catalytic metals to the metallic state; c) terminating the flow of hydrogen while maintaining the gas flow to essentially eliminate hydrogen from the gas flow, and then providing a flow of oxygen and water in the gas flow to result in a third gaseous stream comprising inert gas, oxygen and water, and contacting the catalyst with the third gaseous stream under catalyst conditioning conditions and for a time sufficient to saturate the catalyst with water to result in a water saturated catalyst; d) supplying a source of halogen into the gas flow to result in a fourth gaseous stream comprising inert gas, oxygen, water and source of halogen, and treating the water saturated catalyst with the fourth gaseous stream under oxyhalogenation conditions comprising temperature and time effective to halogenate and disperse the catalytic metal to result in an halogenated catalyst comprising dispersed catalytic metals; e) reducing the temperature of the halogenated catalyst; f) removing excess halogen from the halogenated catalyst by terminating the flow of the source of halogen to result in a fifth gaseous stream comprising inert gas, oxygen, and water, and exposing the halogenated catalyst to the fifth gaseous stream for a time and under conditions comprising a low pressure which may be as low as about atmospheric pressure or lower; g) terminating the flow of water to result in a sixth gaseous stream comprising inert gas and oxygen which is essentially dry and exposing the halogenated catalyst to the essentially dry sixth gaseous stream for a time and under conditions sufficient to dry the halogenated catalyst; h) terminating the flow of oxygen while maintaining the flow of inert gas to result in a seventh gaseous stream comprising inert gas which is essentially devoid of oxygen and passing the seventh gaseous stream over the dry halogenated catalyst for a time sufficient to essentially eliminate oxygen; before i) introducing a flow of hydrogen to result in an eighth gaseous stream comprising inert gas and hydrogen, and exposing the halogenated catalyst from which excess halogen has been removed to the eighth gaseous stream under reducing conditions at low pressures which can be about atmospheric pressure or lower effective to reduce the catalytic metal in the catalyst to the metallic state and result in a regenerated catalyst.

Preferably, the catalyst is a formed catalyst, which more preferably has a shape selected from the group consisting tablets, pellets, spheres, and extrudates. For purposes of the present invention, the catalyst includes a binder material, which is preferably selected from the group consisting of kaolin, alumina, and silica and mixtures thereof to promote binding into aggregates. As used herein alumina binder materials include, but are not limited to, alkali and alkaline earth - containing alumina. The catalyst most preferably is monofunctional and non-acidic, and the zeolite is a large pore zeolite, which preferably is a type L zeolite. The type L zeolite preferably comprises exchangeable cations at least a portion of which are selected from the group of exchangeable cations consisting of lithium, sodium, potassium, rubidium, cesium, calcium, and barium, and mixtures of lithium, sodium, potassium, rubidium, cesium, calcium, strontium, and barium, more preferably, wherein the group of exchangeable cations consists of potassium, and barium, and most preferably are potassium cations.

The Group VIII catalytic metals are preferably Group VIII noble metals which are preferably selected from the group consisting of platinum, palladium, rhodium, iridium, ruthenium and osmium, and most preferably platinum. The amount of the Group VIII catalytic metal present is preferably within the range of about 0.05% to about 6%.

The catalytic metal may further comprise a Group VII B metal, such as rhenium which is a preferred Group VII B metal.

As used herein, the metals have been identified and are grouped in accordance with the Period Table in the *Handbook of Chemistry & Physics*, published by the Chemical Rubber Company, 48th edition.

For purposes of the present invention, as described above, the process conditions comprise a linear gas velocity through the catalyst of at least about 0.5 FPS; a temperature within the range of about 300° C. to about 550° C.; pressures within the range of about 14.7 psia to about 300 psia. The concentrations of the gases used depend upon the operating pressure and are adjusted accordingly to yield a desired range of partial pressure of the gas component wherein the partial pressure of gas A=the concentration of A×the total pressure. Also, in accordance with the present invention the effluent gas, i.e., the gas stream from the outlet of the vessel containing the catalyst, is preferably recycled through the vessel containing the catalyst, rather than operating as a once-through process. If the regeneration process of the present invention includes the recycle of the effluent, then a fraction or portion of the effluent gas must be purged and replaced with fresh inert gas. The purge rate is typically about 5% to about 30% of the recycle gas rate, preferably about 10 to 20%.

In accordance with the present invention, the coke burn step a) of the above-described process involves a first stage at a lower temperature and a second stage at a higher temperature, preferably wherein the second stage is for a longer time than the time of the first stage.

The lower temperature is preferably within the range of about 400° C. to about 500° C., and the higher temperature is within the range of about 500° C. to about 550° C. Preferably the lower temperature is raised to the higher temperature at a rate within the range of about 25° C. to about 50° C. /hr., preferably wherein the lower temperature is about 445° C. and the higher temperature is about 510° C.

In accordance with the present invention, the catalyst is contained in a vessel having an inlet and the oxygen is present in the first gaseous stream at a partial pressure up to about 10 psia at the reactor inlet. The first stage of the coke burn is carried out between about 400° C. and about 500° C., preferably between about 400° C. and about 480° C., and more preferably at about 445° C. Preferably the catalyst is contained in a vessel having an inlet and at the inlet the oxygen is present in the gaseous stream in the first stage at a lower concentration of oxygen than the oxygen concentration the second stage. A gas stream comprising low concentrations of oxygen, i.e. within the range of about 500 vppm to about 6000 vppm, preferably between about 1000 vppm and 4000 vppm, in inert gas is used in the primary coke burn to avoid excessively high temperature, because of adiabatic coke burn condition. Under adiabatic coke burn, the increase in the flame front temperature depends solely on oxygen concentration regardless of the total pressure. Higher oxygen concentration can be used in the primary coke burn when the coke burn is not carried out at the adiabatic condition, e.g. an external cooling to the reactor is available or a higher heat capacity inert gas other than nitrogen is used. In accordance with the present invention, the oxidation conditions comprise a reactor pressure within the range of about 14.7 psia to 300 psia, preferably of about 14.7 to about 200 psia, and more preferably of about 50 psia to about 200 psia.

The vessel also has an outlet and the first stage is performed for a time until the molar ratio of carbon dioxide to oxygen in the reactor outlet gas falls to about 3:1. The time to complete the primary coke burn step varies with the concentration of coke on catalyst, space velocity, and oxygen concentration in the reactor inlet gas and can take between 2 and fifty hours. The secondary coke burn step, or the second stage of the coke burn is initiated by raising inlet gas temperature to a range between about 500° C. and about 550° C., preferably between 500° C. and 520° C., and more preferably at about 510° C. The inlet oxygen concentration is adjusted to yield an oxygen partial pressure within the range of about 0 psia up to about 10 psia, preferably of about 0.1 psia to about 8 psia, and more preferably within the range of about 2 psia to 7 psia. The secondary coke burn is continued until the partial pressure of carbon dioxide at the reactor outlet falls below about 0.01 psia, and preferably below about 0.004 psia.

Water can be introduced to the reactor inlet gas stream during coke burn step to yield water partial pressure within the range of about 0 psia up to about 3 psia, preferably within the range of about 0 psia to about 2 psia, and more preferably within the range of about 0 psia to about 1 psia, and most preferably within the range of about 0 psia.

In accordance with the present invention, the hydrogen is present in the second gaseous stream at a partial pressure greater than 0.015 psia, preferably between about 0.015 psia and about 14.7 psia, more preferably between about 0.15 psia and about 5 psia, and most preferably between 0.4 psia and 1 psia. This treatment is performed at a temperature within the range of about 300° C. to about 550° C., and preferably wherein the temperature is within the range of about 450° C. to about 530° C., more preferably within the range of about 480° C.-520° C., and most preferably is about 5100.

For purposes of the present invention, the conditions of the hydrogen reduction treatment in step b) include a reactor pressure within the range of about 14.7 psia to 300 psia, preferably of about 14.7 psia to about 200 psia, more preferably of about 14.7 psia to about 65 psia, and most preferably at about 14.7 psia. Water can be introduced to the reactor inlet gas stream during preoxyhalogenation reduction step to yield water partial pressure within the range of about 0 psia to about 3 psia, preferably within the range of about 0 psia to about 2 psia, and more preferably within the range of about 0 psia to about 1 psia. However, most preferably no water is introduced to the reactor inlet gas stream in which case the partial pressure of water is about 0 psia. Also, the conditions of the exposing treatment in the preoxyhalogenation hydrogen reduction step b) include a linear gas flow rate through the catalyst above about 0.5 feet per second (FPS), and the exposing treatment in step b) is preferably continued for a time up to about 5 hours, and more preferably within the range of about 30 minutes to about 2 hours.

In accordance with the present invention, the temperature in the preoxyhalogenation conditioning step c) is within the range of about 300° C. to about 540° C., preferably of about 500° C. to about 530° C., and more preferably at about 510° C.

Preferably the third gaseous stream at the reactor inlet comprises water at a water partial pressure within the range of about 0 psia to about 3 psia, preferably within the range of about 0 psia to about 2 psia, and more preferably within the range of about 0.2 psia to about 2 psia, and most preferably is about 1 psia. Preferably the catalyst is treated with the third gaseous stream until it is saturated with water at the specified water partial pressure.

The oxygen partial pressure in the third gaseous stream at the reactor inlet is suitably within the range of about 0 psia to about 10 psia, preferably within the range of about 1 psia to about 5 psia, and more preferably within the range of about 1 psia to 2 psia.

For purposes of the present invention, the preoxyhalogenation conditioning step c) is continued for a time within the range of up to about 120 minutes after saturation of the catalyst, and preferably is continued for a time up to about 90 minutes after saturation of the catalyst. This step is conducted at a reactor pressure within the range of about 14.7 psia to 300 psia, preferably within the range of about 14.7 psia to about 200 psia, and more preferably within the range of about 50 psia to about 200 psia. Preferably the catalyst is contacted with the third gaseous stream in pre-oxyhalogenation conditioning step c) by passing the third gaseous stream through a bed of the catalyst at a flow rate of at least about 0.5 FPS.

In accordance with the present invention, oxygen in the fourth gaseous stream at the reactor inlet has a partial pressure suitably within the range of about 0 psia to about 10 psia, preferably within the range of about 1 psia to about 5 psia, and more preferably within the range of about 1 psia to 2 psia. The water partial pressure at the reactor inlet suitably within the range of about 0 psia to about 3 psia, preferably within the range of about 0 psia to about 2 psia, and more preferably within the range of about 0.2 psia to about 2 psia.

This source of halogen in the fourth gaseous stream at the reactor inlet has a partial pressure suitably within the range of about 0 psia to about 0.5 psia, preferably within the range of about 0.02 psia to about 0.5 psia, more preferably within the range of about 0.02 psia to 0.3 psia, and most preferably within the range of about 0.02 psia to about 0.2 psia. The oxychlorination step is conducted suitably at a total pressure within the range of about 14.7 psia to 300 psia, preferably within the range of about 14.7 to about 200 psia, and more preferably of about 50 psia to about 200 psia. The concentrations of oxygen, water, and chlorine-containing compound injected at the reactor inlet are adjusted according the reactor total pressure to yield the respective reactor inlet partial pressures, wherein the partial pressure of gas A=the concentration of gas A×the total pressure. Preferably the source of halogen in the fourth gaseous stream is a source of chlorine, wherein the source of chlorine is a member selected from the group consisting of $Cl_2$, HCl, chlorinated hydrocarbons and mixtures of $Cl_2$, HCl and chlorinated hydrocarbons, and wherein the source of chlorine is most preferably HCl. In accordance with the present invention, exposing the decoked and reduced catalyst to the fourth gaseous stream in oxyhalogenation step d) is performed at a temperature within the range of about 480° C. to about 550° C., preferably within the range of about 500° C. to about 530° C., and more preferably at about 510° C.

The exposing treatment in oxychlorination step d) is continued until chlorine appears at the reactor outlet at a partial pressure greater than 0.01 psia, i.e., chlorine breakthrough, which is generally accomplished in a time within the range of about 2 hours to about 6 hours.

After chlorine breakthrough, step (d) is continued for an additional time period of up to 6 hours, preferably within the range of about 2 hours to about 5 hours.

In accordance with the present invention, the temperature of the halogenated catalyst is reduced in a postoxychlorination cool down step e) by reducing the temperature of the fourth gas stream to a reduced temperature within the range of about 300° C. to about 400° C., preferably wherein the reduced temperature is about 345° C.

In accordance with the present invention, the fifth gaseous stream comprises water at a partial pressure within the range of about 0 psia up to about 3 psia, preferably within the range of about 0 psia to about 2 psia, more preferably of about 0.01 psia to about 1 psia, and most preferably within the range of about 0.2 psia to about 0.6 psia, wherein the partial pressure of gas A=the concentration of gas A×the total pressure. The oxygen partial pressure in the fifth gaseous stream at the reactor inlet is suitably within the range of about 0 psia up to about 4.5 psia, preferably within the range of about 0 psia to about 3 psia, and more preferably within the range of about 0.7 psia to 3 psia.

The exposing treatment in postoxychlorination step f) is performed at a temperature within the range of about 300° C. to about 400° C. and preferably about 345° C., and low pressure which can be up to about 65 psia, and preferably at about 14.7 psia.

In accordance with the present invention, the catalyst is contained in a vessel having an outlet and the time in postoxychlorination step f) is sufficient to reduce the concentration of halogen as hydrogen halide in the fifth gas stream at the outlet to a partial pressure less than about 0.004 psia, preferably less than about 0.0015 psia, and more preferably less than about 0.0007 psia.

The halogenated catalyst is exposed to the sixth gaseous stream in step (g) comprising inert gas and oxygen at an oxygen partial pressure within the range of about 0 psia to about 4.5 psia, preferably within the range of about 0 psia to about 3 psia, and more preferably within the range of about 0.7 psia to 3 psia. The step (g) is continued until the water partial pressure at the reactor outlet is less than about 0.004 psia, preferably less than 0.003 psia, and more preferably less than about 0.0015 psia. The reactor pressure in step (g) and the following step (h) is within the range of about 14.7 psia to about 65 psia, and preferably is at about 14.7 psia. Preferably the water partial pressure in step (g) and the following step (h) is about 0 psia but can be in the range between about 0 psia up to about 0.004 psia as described above. The temperature in step (g) and the following step (h) is within the range of about 300° C. to 400° C., and preferably at about 345° C.

The dry halogenated catalyst is exposed to the seventh gaseous stream in step (h) comprising inert gas which is substantially devoid of oxygen for a time sufficient to lower oxygen partial pressure to below 0.02 psia so as to avoid formation of an explosive mixture when hydrogen is added.

In accordance with the present invention, the halogenated catalyst is exposed to the eighth gaseous stream in reduction step i) at a temperature within the range of about 300° C. to about 400° C., and preferably wherein the temperature in reduction step i) is about 345° C. The time of reduction step i) is within the range of about 1 hour to about 5 hours. The pressure of reduction step i) is within the range of about 14.7 psia to about 65 psia, and preferably is about 14.7 psia.

For purposes of the present invention, hydrogen is present in the eighth gaseous stream at a partial pressure greater than about 0.015 psia, preferably within the range of about 0.015 psia to about 14.7 psia, more preferably within the range of about 0.15 psia to about 5.0 psia, and most preferably within the range of about 1 psia to about 3 psia.

Preferably the halogenated catalyst is exposed to the eighth gaseous stream in reduction step i) at a gas flow rate of about 0.5 FPS. Preferably, the eighth gaseous stream is also essentially devoid of water.

Step (g) can be omitted when steps (h) and (i) are carried out under wet environment. If water is present in steps (h) and (i), the water partial pressure at the reactor inlet is within the range of about 0 psia to about 3 psia, preferably within the range of about 0 psia to about 2 psia, more preferably within the range of about 0.01 psia to about 1 psia, and most preferably within the range of about 0.2 psia to about 0.6 psia. In such embodiment, however, the catalyst has to be dried out after wet reduction in step (i) and before introducing hydrocarbon feed into the reactor with either nitrogen or hydrogen to a water partial pressure less than 0.004 psia, preferably less than 0.003 psia, and more preferably less than 0.0015 psia.

It is discovered that the use of HCl during coke burn can effectively remove the carbonaceous residues from the spent catalyst. This procedure dramatically reduces the coke burn temperature and minimizes the problems of local hot spots, the temperature run away, and the metal agglomeration.

The present invention is also directed to a process for treating catalysts, which involves flushing hydrocarbon which remain in the reactors from the reforming operation out of the reactors. This is accomplished by flushing the reactors with a hydrogen and/or inert gas stream. For purposes of the present invention, the purge operation involves a first step of introducing a flow of hydrogen or inert gas to result in a first gaseous stream comprising an inert gas and hydrogen which is essentially devoid of oxygen; the catalyst is initially exposed to the first gaseous stream to purge hydrocarbon remaining in the reactor from reforming operations out of the reactor. After purging, the flow of hydrogen is terminated while maintaining the inert flow to essentially eliminate hydrogen from the gas flow, and then water is added in the gas flow to result in a second gaseous stream comprising inert gas and water. The catalyst is then contacted with the second gaseous stream under catalyst conditioning conditions for a time sufficient to saturate the catalyst with water to result in a water saturated catalyst. Oxygen and a source of halogen are then supplied into the gas flow to result in a third gaseous stream comprising inert gas, oxygen, water and a source of halogen; the water saturated catalyst is treated with the third gaseous stream under oxyhalogenation conditions comprising temperature and time effective to halogenate and disperse the catalytic metal to result in a halogenated catalyst comprising dispersed catalytic metals. The temperature of the halogenated catalyst is then reduced before removing excess halogen from the halogenated catalyst by terminating the flow of the source of halogen to result in a fourth gaseous stream comprising inert gas, oxygen, and water, and then exposing the halogenated catalyst to the fourth gaseous stream for a time and under conditions comprising a pressure of up to about 65 psia, and preferably at about atmospheric pressure. The flow of water is then terminated so as to result in a fifth gaseous stream comprising inert gas and oxygen which is essentially dry, and exposing the halogenated catalyst to the essentially dry fifth gaseous stream for a time and under conditions sufficient to dry the halogenated catalyst. The flow of oxygen is then terminated while maintaining the flow of inert gas to result in a sixth gaseous stream comprising inert gas which is essentially devoid of oxygen and passing the sixth gaseous stream over the dry halogenated catalyst for a time sufficient to essentially eliminate oxygen before introducing a flow of hydrogen to result in a seventh gaseous stream comprising inert gas and hydrogen, and exposing the halogenated catalyst from which excess halogen has been removed to the seventh gaseous stream under reducing conditions comprising less than about 65 psia, and preferably at about atmospheric pressure effective to substantially reduce the catalytic metal in the catalyst to the metallic state and result in a regenerated catalyst.

The present invention is also directed to a process for treating reforming catalysts comprising at least one Group VIII metal utilizing an inert gas flow, which involves subjecting a catalyst which has been treated with oxygen to burn coke therefrom to a gaseous stream comprising inert gas and hydrogen under conditions and for a time effective to reduce the Group VIII metal to the metallic state to result in a reduced catalyst; and then treating the reduced catalyst to another gaseous stream comprising the inert gas and a source of halogen and/or halogen and oxygen under conditions and for a time effective to halogenate and disperse the Group VIII metal to result in an halogenated catalyst comprising dispersed Group VIII metal.

The present invention is also directed to a process for treating reforming catalyst comprising at least one Group VIII metal utilizing an inert gas flow, which involves treating a catalyst with a gaseous stream comprising inert gas, oxygen and water under conditions and for a time sufficient to result in a moistened catalyst having a moisture content in equilibrium with the gaseous stream, and then subjecting the moistened catalyst to another gaseous stream comprising inert gas and a source of halogen and/or halogen and oxygen under conditions and for a time effective to halogenate and disperse the Group VIII metal to result in an halogenated catalyst comprising dispersed Group VIII metal.

The present invention is also directed to a process for treating reforming catalysts comprising at least one Group VIII metal utilizing an inert gas flow, which involves subjecting an halogenated catalyst to a gaseous stream comprising inert gas, oxygen and water under conditions comprising a pressure of no greater than about 65 psia, and preferably at about atmospheric pressure and for a time effective to remove excess halogen from the halogenated catalyst; prior to exposing the halogenated catalyst from which excess halogen has been removed to another gaseous stream comprising inert gas and hydrogen under reducing conditions at less than about 65 psia, and preferably at about atmospheric pressure effective to reduce the Group VIII metal in the catalyst to the metallic state and result in a regenerated catalyst.

The present invention is also directed to a process for regenerating a deactivated catalyst comprising at least one Group VIII metal utilizing an inert gas flow, which involves exposing an halogenated catalyst to a gaseous stream comprising inert gas and hydrogen under reducing conditions and at less than about 65 psia, and preferably at about atmospheric pressure effective to reduce the Group VIII metal in the catalyst to the metallic state and result in a regenerated catalyst.

DETAILED DESCRIPTION OF INVENTION

Pre-Regeneration Reactor Purge

The first step in the regeneration procedure is to purge hydrocarbons and then purge hydrogen remaining from hydrocarbon processing out of the reactor. This is done by establishing a flow of hydrogen to the reactor and continuing hydrogen flow until hydrocarbon is displaced by hydrogen. Then hydrogen flow is terminated, and a gas flow comprising inert gas, preferably nitrogen, is established through the catalyst bed and continued until hydrogen is displaced with inert gas. In accordance with the present invention it is important that the gas flow is substantially free of contaminates, such as ethylene, CO, and sulfur, and other substances which would be harmful or adversely affect the catalyst. Although the step of purging the reactor is described in detail at this stage of the process, i.e., prior to the coke burn step, it should be noted that the reactor may be purged in a similar manner between any of the subsequently described steps as desired or deemed to be necessary. For example, it is of practical importance to purge between steps to remove any gases from the reactor which might undergo a detrimental or adverse reaction if permitted to remain in the reactor during a subsequent step, such as oxygen and hydrogen.

Purging can be done over a wide range of conditions. Suitable pressures can range from about 14.7 psia up to about 300 psia and suitable temperatures are those within the range of about 400° C. to about 500° C. The preferred pressure is about 14.7 psia. The inert gas flow rate should be sufficient to establish at least about 0.5 FPS linear gas velocity through the catalyst bed at operating pressure and temperature. This insures uniform gas flow distribution across the catalyst bed and effective gas/solid contacting for good purging action. Purging at these conditions for one to five hours adequately purges the reactor. Also, in accordance with the present invention the effluent gas, i.e., the gas stream from the outlet of the vessel containing the catalyst, is preferably recycled through the vessel containing the catalyst, rather than operating as a once-through process. If the regeneration process of the present invention includes the recycle of the effluent, then a fraction or portion of the effluent gas must be purged and replaced with fresh inert gas. The purge rate is typically about 5% to about 30% of the recycle gas rate.

Coke Burn

Coke which accumulates on the catalyst during hydrocarbon processing must be removed to regenerate the catalyst because catalytic performance of the regenerated catalyst is impaired if coke residues remain on the catalyst. Coke is removed by burning it off with oxygen. In addition to using oxygen, ozone can also be used for this purpose. Although not wishing to be bound by any particular theory, it is believed that the use of ozone speeds up the coke burn. The partial pressure of oxygen in this gas stream during coke burn can be up to 10 psia. However, care must be exercised to avoid exposing the catalyst to excessively high temperatures. In another embodiment, halogen, such as HCl, can be included in this gas flow. In accordance with the present invention, the coke burn is conducted in two stages: a primary coke burn at less severe conditions followed by a secondary coke burn at more severe conditions. The two-stage coke burn has been discovered to be advantageous in mitigating risk of exceeding zeolite decomposition temperature at the flame front. The coke burn is conducted at a pressure as low as about 14.7 psia but up to about 300 psia and preferably up to about 200 psia, with a pressure within the range of about 50 psia to about 200 psia being more preferred, and a pressure of about 185 psia being most preferred. Gas flow rate to the reactor is set to maintain at least about 0.5 FPS linear gas velocity through the catalyst.

The primary coke burn is initiated by injecting oxygen, ozone, or air into the inert gas flowing to the reactors. The inlet gas temperature is between about 400° C. to about 500° C., and preferably between about 400° C. and about 480° C., and more preferably about 445° C., and the oxygen concentration in the reactor inlet gas is adjusted to between about 500 vppm and about 6000 vppm, and preferably between about 1000 vppm and about 4000 ppm. A low concentration of oxygen is used in the primary coke burn to avoid excessively high temperature, because of adiabatic coke burn condition. Under adiabatic coke burn, the increase in the flame front temperature depends solely on oxygen concentration regardless of total pressure. Higher oxygen concentration can be used in the primary coke burn when the coke burn is not carried out at the adiabatic condition, e.g. an external cooling to the reactor is available or a higher heat capacity inert gas other than nitrogen is used. During the primary coke burn the gas flow may be essentially devoid of water having a water partial pressure of about 0 psia or include an amount of water and having a water partial pressure of up to about 3 psia. Thus, the gas stream during coke burn can have a partial pressure of water within the range of 0 psia to about 3 psia, preferably within the range of about 0 psia to about 2 psia, and more preferably within the range of about 0 to 1 psia. At these conditions the temperature of the catalyst is maintained safely below catalyst decomposition temperature at a most preferred pressure of about 185 psia. $CO_2$ and oxygen concentration in the reactor outlet gas stream are continuously measured to determine when the primary coke burn is completed, i.e., when molar ratio of $CO_2$ to $O_2$ falls below about 3:1, which occurs typically about two to fifty hours into the burn.

Then transition into the secondary coke burn is begun. Gas inlet temperature is then raised at a rate of about 25° C. to about 50° C. per hour to the secondary coke burn temperature which is between about 500° C. and about 550° C., and preferably within the range of about 500° C. to about 520° C., and more preferably at about 510° C., at a most preferred pressure of a 185 psia. Simultaneously, oxygen partial pressure is raised to a secondary coke burn level, i.e., up to about 10 psia, preferably within the range of about 0.1 psia to about 8 psia, and more preferably within the range of about 2 psia to about 7 psia. In the secondary coke burn, water may be present at a partial pressure up to about 3 psia, preferably up to about 2 psia, and more preferably up to 1 psia. However, most preferably the gas flow is essentially devoid of water and has a water partial pressure of about 0 psia.

The secondary coke burn is continued until the $CO_2$ partial pressure in the outlet gas from the reactor falls below about 0.01 psia, and preferably below 0.004 psia; this typically occurs about 12 hours into the secondary burn, depending on the amount of catalyst in the reactor. It has been discovered that the activity of regenerated catalyst is impaired if the coke burn is terminated prematurely, i.e., before $CO_2$ partial pressure falls below about 0.004 psia to about 0.01 psia.

During coke burn, the gas stream is recycled or recirculated from the tail reactor to the lead reactor, where a series of two or more reactors is used, in order to conserve nitrogen of the inert carrier gas by employing an in-line recycle gas compressor. Preferably, about 10% of the recycle gas flow is purged with the fresh coke burn gas prior to recirculating the stream.

Pre-Oxychlorination Hydrogen Reduction

In accordance with the present invention, it has been discovered that regenerated catalyst activity is higher when the catalyst is exposed to hydrogen after coke burn, but before oxychlorination.

As previously discussed, before hydrogen is introduced, however, oxygen remaining in the reactor after the coke burn must be purged from the reactor to preclude forming combustible mixtures of hydrogen and oxygen. In this stage, oxygen purging is preferably accomplished by cutting off oxygen flow and continuing nitrogen flow through the reactors.

For purposes of the present invention, feeding nitrogen for a time within the range of about 30 minutes to several hours at a temperature of about 510° C. and at a pressure within the range of about 14.7 psia and 300 psia is suitable for reducing oxygen concentration to a safe level; and the nitrogen linear velocity is maintained in the catalyst beds at least about 0.5 FPS to achieve adequate gas distribution and gas/solid contacting.

Hydrogen reduction is initiated by starting flow of hydrogen into the nitrogen flowing into the reactors. Conditions for hydrogen reduction can be varied over a wide range. Hydrogen partial pressure is greater than 0.015 psia, preferably between 0.015 psia and 14.7 psia, more preferably between 0.15 psia to 5 psia, and most preferably between 0.4 psia and 1 psia. Pressures are between about 14.7 psia to about 300 psia, preferably is within the range of about 14.7 psia to about 200 psia. more preferably is within the range of 14.7 psia and 65 psia, and most preferably at about 14.7 psia. Temperatures between from about 300° C. to about 550° C. are satisfactory with about 450° C. to about 530° C. being preferred, about 480° C. to 5200C. being more preferred, and about 510° C. most preferred. Linear gas velocity through the catalyst beds should achieve uniform gas distribution and effective gas/solid contacting with the catalyst. In an axial adiabatic reactor the gas flow should be at least about 0.5 FPS. Reduction time of up to 5 hrs is normally adequate with 0.5 hrs to 2 hrs being preferred.

Water can be introduced to the reactor inlet gas stream during preoxyhalogenation reduction step to yield water partial pressure of up to about 3 psia, although it is most preferred that the gas stream be essentially devoid of water and have a partial pressure of water of about 0 psia. Preferably the water partial pressure during this reduction step is within the range of about 0 psia up to about 2 psia, and more preferably is within the range of about 0 psia to about 1 psia.

After completing hydrogen reduction, hydrogen flow is cut off and inert gas flow is continued to purge hydrogen so that oxygen required in the next step can be safely introduced. The purge can be done over a wide range of conditions; for example, passing inert gas through the catalyst at about 14.7 psia to about 300 psia at a temperature within the range of about 300° C. to about 550° C. at a gas flow rate of above about 0.5 FPS for about 30 minutes to several hours adequately clears hydrogen.

In this hydrogen step, as well as the coke burn step, wherein the gas is recycled (except for the 10% purged), hydrogen can be also recycled. This hydrogen step is most preferably performed at atmospheric pressure.

Pre-Oxychlorination Conditioning

In accordance with the present invention, it has been discovered that the activity of regenerated catalyst is increased by exposing the catalyst to water and oxygen prior to oxychlorination. This treatment saturates the catalyst with water and oxidizes metals in the catalyst. The amount of water adsorbed by the oxide support of the catalyst depends on the partial pressure of water in the gas phase. During the reduction step, which is carried out after the coke burn step, the amount of water on the catalyst may not be at the right condition since water partial pressure may be too low in the reduction step. The water partial pressure is increased by injecting water into the reactor in the post chlorination conditioning step so that the oxide support can acquire the equilibrated amount of adsorbed water under the specified water partial pressure. Wetting the catalyst, preferably to saturation prior to initiating oxychlorination avoids exposing dry catalyst to chlorine at oxychlorination conditions which, in accordance with the present invention, has been discovered to impair activity of regenerated catalyst.

Pre-oxychlorination conditioning is done at a pressure within the range of about 14.7 psia to 300 psia, preferably of about 14.7 psia to about 200 psia, more preferably of about 50 psia to about 200 psia, and most preferably at about 185 psia, and temperatures between about 300° C. to about 540° C., with temperatures within the range of about 500° C. to about 530° C. being preferred, and a temperature of about 510° C. being most preferred. Water partial pressure ranges from about 0 psia to about 3.0 psia, preferably 0 psia to 2 psia, more preferably between 0.2 psia, and most preferably at about 1 psia; oxygen partial pressure ranges from about 0 psia to about 10 psia, with 1 psia to 5 psia being preferred, and with 1 psia to 2 psia being more preferred. Inert gas linear velocity through the catalyst beds is maintained above about 0.5 FPS at operating pressure and temperature. Flow of the gas stream containing inert gas, oxygen and water is continued for an additional 2 hours after water partial pressure in the reactor outlet stream exceeds about 0.76 psia and preferably for up to about 90 minutes longer to insure that the catalyst is saturated with water and that metals are completely oxidized.

Oxychlorination

The catalytic metals at this point in the regeneration procedure are typically agglomerated. Metal chloride molecules are mobile and disperse across the zeolite surfaces with facility. The metals are chlorinated by exposure to oxygen, water and a source of chlorine all in an inert carrier gas.

Oxychlorination is done at a pressure within the range of about 14.7 psia to about 300 psia, preferably within the range of about 14.7 psia to about 200 psia, more preferably within the range of about 50 psia to about 200 psia, and most preferably at about 185 psia. oxychlorination temperatures are between about 480° C. and 550° C., preferably between 500° C. and 530° C., and most preferably at about 510° C. Inert gas flow rate is adjusted to make the linear gas velocity in the reactors above about 0.5 FPS at operating pressure and temperature. HCl is a preferred chlorine source because HCl converts to chlorine by reaction with oxygen via the Deacon reaction so chlorine is really the active chlorinating agent. Water partial pressure in the reactor inlet gas is between about 0 psia and about 3.0 psia, preferably between about 0 psia and about 2 psia, and most preferably 0.2 psia to about 2 psia. Oxygen partial pressure is between about 0 psia and about 10 psia, preferably between about 1 psia and about 5 psia, and more preferably between about 1 psia and about 2 psia. HCl partial pressure in the reactor inlet gas ranges up to about 0.5 psia, preferably within the range of about 0.02 psia to about 0.5 psia, and more preferably of about 0.02 to about 0.3 psia, and most preferably within the range of about 0.02 to 0.2 psia.

Completion of oxychlorination is signaled by appearance of chlorine and HCl, referred to herein as chlorine breakthrough, in the reactor effluent gas at a partial pressure greater than 0.01 psia. Time to chlorine breakthrough after initiation of HCl flow is proportional to the chlorine feed rate and is inversely proportional to the amount of catalyst in the reactors; it typically takes between about 2 to about 6 hours.

After chlorine breakthrough, oxychlorination is continued for an additional time period of up to about 6 hours, preferably within the range of about 2 hours to about 5 hours.

In a manner similar to coke burn, the gas stream is recycled, i.e., recirculated, from the tail reactor to the lead reactor, where a series of two or more reactors is used, in order to conserve nitrogen of the inert carrier gas by employing an in-line recycle gas compressor. Preferably, about 10% of the recycle gas flow is purged with the purged amount being replaced with fresh oxychlorination gas prior to recirculating the stream.

Post Oxychlorination Cool Down

Higher regenerated catalyst activity is obtained when the post oxychlorination steps are conducted at lower temperature, i.e., within the range of about 300° C. to about 400° C., and preferably at about 345° C., than the oxychlorination temperature which is in the range of about 480° C. to about 550° C. Accordingly, the catalyst is cooled from oxychlorination temperature to a lower post treat temperature prior to oxychlorination post treatment. Preferably the cooling is done under an oxychlorination atmosphere to prevent premature reduction and agglomeration of catalytic metals. In this embodiment of the present invention, cool down is accomplished by continuing the flow of oxychlorination feed gas, preferably having a HCl partial pressure of up to about 0.5 psia, preferably between about 0.02 psia to about 0.5 psia, more preferably between about 0.02 psia to about 0.3 psia, and most preferably between about 0.02 psia and about 0.2 psia. Alternatively, a gas which is essentially devoid of HCl can be used in this stage while reducing the temperature of the catalyst to the requisite lower temperature for the post oxychlorination steps in order to obtain higher regenerated catalyst activity. The time required to cool the catalyst down to such lower temperatures, however, depends on the characteristics of the equipment in the plant and the temperature drop specified. In accordance with the present invention, it has been discovered that cool down does not impair regenerated catalyst performance when done under an oxychlorination atmosphere.

Post-Oxychlorination Stripping

In accordance with the present invention, it has also been discovered it is beneficial to regenerated catalyst activity to remove chlorine from the catalyst prior to the final reduction, and that the more chlorine removed before the final hydrogen reduction, the higher the activity of the regenerated catalyst. Accordingly, prior to the final reduction, the catalyst is stripped to remove chlorine prior to the final reduction. This is preferably accomplished by exposing the catalyst to a stream of inert gas containing oxygen at the lowest pressure, i.e., atmospheric pressure or even vacuum, which can be used depending on the circumstances. However, pressures as high as about 65 psia, and preferably at about 14.7 psia may be used in certain situations. Temperature during this stripping step may range from about 300° C. to about 400° C., with 345° C. being preferred. Water partial pressure in the treat gas during stripping is within the range of up to about 3 psia, preferably up to about 2 psia, more preferably within the range of about 0.01 psia to about 1 psia, and most preferably within the range of about 0.2 psia to about 0.6 psia. Where water is included in the gas flow, the stripping is referred to herein as a wet stripping, and oxygen partial pressure up to about 4.5 psia, preferably up to about 3 psia, and more preferably within the rang of about 0.7 to about 3 psia. The inert gas flow rate during this stripping step is fixed to maintain at least about 0.5 FPS linear gas velocity through the catalyst beds.

Wet stripping in the previously described manner is continued until HCl partial pressure in the reactor effluent, i.e., exhaust HCl partial pressure, falls below about 0.004 psia, preferably below about 0.0015 psia and more preferably below about 0.0007 psia; exhaust HCl partial pressure in this range signal that chlorine concentration on the catalyst is acceptably low. Typically, exhaust HCl partial pressure falls into the 0.004 psia to 0.0007 psia range after about 2 to about 12 hours of wet stripping treatment.

Optionally, water flow may be then discontinued and the flow of inert gas and oxygen continued for about one hour to dry the system to prepare for the subsequent hydrogen reduction. In this embodiment, oxygen flow is cut off and inert gas flow is continued for about one hour to purge oxygen out of the reactor system prior to introducing hydrogen.

Alternatively, the stripping or soaking can be performed with a substantially dry gas stream having a partial pressure of water of essentially 0 psia.

As in the hydrogen reduction step, these stripping steps, which are most preferably performed at atmospheric pressure, use once-through gas, which is then exhausted or purged from the outlet of the reactor vessel. In a reactor train, the gas would be purged or exhausted from the downstream tail reactor. Alternatively, this step can be performed using recycle gas at a pressure up to 65 psia.

Final Hydrogen Reduction

The final step in the regeneration procedure is to reduce the catalytic metals, which at this point are dispersed in the zeolite as chloride molecules, to their zero valent metallic state without substantial agglomeration. Reduction in accordance with the present invention is accomplished by introducing hydrogen at a partial pressure greater than about 0.015 psia, preferably within the range of about 0.015 psia to about 14.7 psia and more preferably within the range of about 0.15 psia to about 5 psia, and most preferably within the range of about 1 psia to about 3 psia, into the inert gas flowing to the reactors, which induces rapid evolution of hydrogen chloride into the treat gas. However, in this step a gas flow which is essentially 100% hydrogen could be used. Thus, HCl partial pressure rises as the reduction treat gas, in this step the inert gas including hydrogen, moves downstream through the catalyst. This step is continued until an endpoint HCl partial pressure at the reactor outlet is less than about 0.0075 psia. It has been discovered that reactions between HCl and unreduced catalyst downstream of the reaction front impair regenerated catalyst activity. Accordingly, the reduction is conducted to minimize the interaction between HCl and unreduced catalyst. In accordance with the present invention, in order to minimize these undesirable reactions, reduction is performed at low temperature relative to oxychlorination temperature, i.e., at a temperature within the range of about 300° C. and 400° C., and preferably at about 345° C., compared to oxychlorination temperature which is between about 480° C. and about 550° C. Also, reduction is performed at the lowest practicable pressure, i.e., about atmospheric pressure. Gas velocity through the catalyst bed is maintained at above about 0.5 FPS for good gas contacting. Reduction time of one to seven hours has been discovered to be suitable for insuring complete reduction, with six hours being preferred.

As in the previous reduction step, this stage of hydrogen reduction, which is most preferably performed at atmospheric pressure, uses once-through hydrogen with nitrogen as the inert carrier gas, which is then purged downstream of the tail reactor. Alternatively, this step can be performed using recycled hydrogen and nitrogen at a pressure up to about 65 psia.

An alternative of the steps after wet post-oxychlorination stripping is to purge the catalyst with wet nitrogen and followed by wet hydrogen reduction. In this case, water is present at a partial pressure at the reactor inlet within the range of up to about 3 psia, preferably of up to about 2 psia, more preferably within the range of about 0.01 psia to about 1 psia, and most preferably within the range of about 0.2 psia to about 0.6 psia. However, the catalyst has to be dried out after wet reduction and before introducing hydrocarbon feed into the reactor with either nitrogen or hydrogen to a water partial pressure less than 0.004 psia, preferably less than 0.003 psia, and more preferably less than 0.0015 psia.

The following Table 1 tabulates conditions used for the components of the gas streams and each of the steps of the regeneration process described above, and identifies preferred, more preferred and/or most preferred ranges therefor.

TABLE 1

| Regeneration Step | Components | Suitable | Preferable | More Preferable | Most Preferable |
|---|---|---|---|---|---|
| Primary Coke Burn | Oxygen | 500–600 ppm | 1000–4000 ppm | | |
| | Water | 0–3 psia | 0–2 psia | 0–1 psia | 0 psia |
| | Pressure | 14.7–300 psia | 14.7–200 psia | 50–200 psia | 185 psia |
| | Temperature | 400–500 C. | 400–480 C. | 445 C. | |
| | End Point | CO2/O2 < 3:1 | | | |
| Secondary Coke Burn | Oxygen | 0–10 psia | 0.1–8 psia | 2–7 psia | |
| | Water | up to 3 psia | up to 2 psia | up to 1 psia | 0 psia |
| | Pressure | 14.7–300 psia | 14.7–200 psia | 50–200 psia | 185 psia |
| | Temperature | 500–550 C. | 500–520 C. | 510 C. | |
| | End Point | CO2 < 0.01 psia | CO2 < 0.004 psia | | |
| Reduction after coke burn | Hydrogen | >0.015 psia | 0.015–14.7 psia | 0.15–5 psia | 0.4–1 psia |
| | Water | up to 3 psia | up to 2 psia | up to 1 psia | 0 psia |
| | Pressure | 14.7–300 psia | 14.7–200 psia | 14.7–65 psia | 14.7 psia |
| | Temperature | 300–550 C. | 450–530 C. | 480–520 C. | 510 C. |
| | Time | up to 5 hrs | 0.5–2 hrs | | |
| Pre-oxycholorination conditioning | Oxygen | 0–10 psia | 1–5 psia | 1–2 psia | |
| | Water | up to 3 psia | up to 2 psia | 0.2–2 psia | 1 psia |
| | Pressure | 14.7–300 psia | 14.7–200 psia | 50–200 psia | 185 psia |
| | Temperature | 300–540 C. | 500–530 C. | about 510 C. | |
| | Time | up to 2 hrs | up to 1.5 hrs (after H2O > 0.76 psia) | | |
| Oxycholorination | Oxygen | 0–10 psia | 1–5 psia | 1–2 psia | |
| | Water | up to 3 psia | up to 2 psia | 0.2–2 psia | |
| | HCl | up to 0.5 psia | 0.02–0.05 psia | 0.02–0.3 psia | 0.02–0.2 psia |
| | Source of Cl | Cholorhydrocarbons, HCl and Cl2 | HCl,Cl2, and CCl4 | HCl2 and Cl2 | HCl |
| | Pressure | 14.7–300 psia | 14.7–200 psia | 50–200 psia | 185 psia |
| | Temperature | 480–550 C. | 500–530 C. | about 510 C. | |
| | Time | up to 6 hrs after Cl2 B/T | 2.5 hrs | | |
| | Breakthrough | Cl2 > 0.01 psia | | | |
| O/C cool down | Same gas composition as Oxychlorination | | | | |
| | Temperature | 300–400 C. | 345 C. | | |
| Wet air soak | Oxygen | up to 4.5 psia | up to 3 psia | 0.7–3 psia | |
| | Water | up to 3 psia | up to 2 psia | 0.01–1 psia | 0.2–0.6 psia |
| | Pressure | 14.7–65 psia | 14.7 psia | | |
| | Temperature | 300–400 C. | 345 C. | | |
| | End point | HCl < 0.004 psia | HCl < 0.0015 psia | HCl < 0.0007 psia | |
| Two sequences of steps can be used after wet air soak: | | | | | |
| Dry air soak + Dry N2 purge + Dry H2 reduction | | | | | |
| or | | | | | |
| Wet N2 purge + Wet H2 reduction | | | | | |
| Dry air soak | Oxygen | up to 4.5 psia | up to 3 psia | 0.7–3 psia | |
| | Water | 0 psia | | | |
| | Pressure | 14.7–65 psia | 14.7 psia | | |
| | Temperature | 300–400 C. | 345 C. | | |
| | End point | H2O < 0.004 psia | H2O < 0.003 psia | | |
| Dry N2 purge | Pressure | 14.7–65 psia | 14.7 psia | | |
| | End point | O2 < 0.02 psia | | | |
| Dry H2 reduction | Hydrogen | >0.015 psia | 0.015–14.7 psia | 0.15–5 psia | 1–3 psia |
| | Water | 0 psia | | | |
| | Pressure | 14.7–65 psia | 14.7 psia | | |
| | Temperature | 300–400 C. | 345 C. | | |
| | HCl release | <0.0075 psia | | | |
| OR | | | | | |
| Wet N2 Purge | Water | up to 3 psia | up to 2 psia | 0.01–1 psia | 0.2–0.6 psia |
| | Pressure | 14.7–65 psia | 14.7 psia | | |
| | Temperature | 300–400 C. | 345 C. | | |
| | End point | O2 < 0.2 psia | | | |
| Wet H2 reduction | Hydrogen | >0.015 psia | 0.015–14.7 psia | 0.15–5 psia | 1–3 psia |
| | Water | up to 3 psia | up to 2 psia | 0.01–1 psia | 0.2–0.6 psia |
| | Pressure | 14.7–65 psia | 14.7 psia | | |
| | Temperature | 300–400 C. | 345 C. | | |
| | HCl release | <0.0075 psia | | | |

EXAMPLES

The following non-limiting examples are presented by way of further illustration of the present invention and are not meant to limit the invention to the specific treatment parameters which are described.

Example I

This example shows that in regeneration, reducing the catalyst with hydrogen after coke burn and before reduction, raised the activity and selectivity of the regenerated catalyst.

The catalyst was an extrudate of zeolite L bound with alumina containing 0.64 wt. % platinum. The catalyst was run at reforming conditions. It contained 1 wt. % coke when the reforming run was terminated. A three gram portion of the coked catalyst was placed in a laboratory reactor. The entire regeneration procedure was performed at atmospheric pressure. The linear velocity of gas flowing through the reactor was 0.5 fps and the inert carrier gas was nitrogen.

The catalyst was dried under flowing nitrogen at 250° C for 12 hours. The catalyst was coke burned at 445° C. with 2.6 vol. % oxygen in nitrogen for two hours and then at 510° C. with 20 vol. % oxygen for 22 hours. Oxygen was purged from the reactor by cutting off oxygen flow and continuing nitrogen flow for 30 minutes.

The catalyst was reduced by passing hydrogen over it at 510° C. for one hour. Hydrogen was purged from the reactor by passing nitrogen through the reactor for thirty minutes.

Platinum in the catalyst was redispersed with a gas containing 0.3 vol. % HCl, 3.4 vol. % water vapor, and 10 vol. % oxygen at 510° C. for six hours. Temperature was reduced to 345° C. The catalyst was stripped free of residual HCl with air containing 3.4 vol. % water vapor at 345° C. for one hour. Air was purged from the reactor with nitrogen and the catalyst was reduced with a gas stream containing 20 vol. % hydrogen in nitrogen at 345° C. for one hour. This regenerated catalyst is Catalyst A.

The experiment was repeated with another three gram sample of the coked catalyst except that the catalyst was not reduced with hydrogen after the coke burn. The catalyst regenerated without preoxychlorination hydrogen reduction is Catalyst B.

The activity of Catalyst A and B was compared by running both at reforming conditions for 46 hours and then determining their benzene yield and selectivities. The test conditions were: 510° C. ; 8 whsv; 107 psia; 4.25 hydrogen to oil ratio; on a feed comprising 40 wt. % normal hexane and 60 wt. % 3 methylpentane.

| CATALYST | Bz YIELD. WT. % | BZ SELECTIVITY WT. % |
| --- | --- | --- |
| A | 33.7 | 68 |
| B | 25.5 | 64 |

The activity and selectivity of catalyst A which was reduced with hydrogen after coke burn and before oxychlorination was significantly higher.

Example II

This example shows that if the post oxychlorination stripping step is done at low (atmospheric) pressure rather than at the higher (100 to 200 psia) oxychlorination pressure, the activity and selectivity of the regenerated catalyst is significantly higher.

The catalyst of Example I was regenerated at 185 psia using the following procedure. Linear gas velocity through the catalyst was 0.5 fps and the inert carrier gas was nitrogen:

1. Coke burn at 445OC for two hours with 1 vol. % oxygen.
2. Coke burn at 510° C. for 14 hours with 3% oxygen.
3. Oxychlorination at 510° C. for three hours with 600 vppm HCl, 0.66 vol. % water vapor, and 0.84 vol. % oxygen.
4. Cool down to 345° C. over four hours under oxychlorination atmosphere.
5. Stripping for three hours with 0.66 vol. % water vapor and 0.84 vol. % oxygen.
6. Stripping with 0.84 vol. % oxygen for one hour.
7. Purge with nitrogen for one hour.
8. Reduce with 0.2 vol. % hydrogen for 2.5 hours.

The catalyst regenerated with this procedure is Catalyst A. A sample of the same catalyst was regenerated using the steps 1 through 4; Steps 5 through 8 were modified as follows:

5a. Stripping at 345° C. with 10 vol. % oxygen and 3 vol. % water in nitrogen at atmospheric pressure for three hours.
6a. Stripping at 345° C. with 10 vol. % oxygen in nitrogen for one hour at atmospheric pressure.
7a. Purge with nitrogen for one hour at atmospheric pressure.
8a. Reduce with hydrogen 10 vol. % for 2.5 hours.

| CATALYST | Bz YIELD. WT. % | BZ SELECTIVITY WT. % |
| --- | --- | --- |
| A | 26 | 64 |
| B | 34 | 69 |

The activity of Catalyst B which was post oxychlorination stripped at low pressure were significantly higher.

Example III

This example shows that preoxychlorination reduction with hydrogen after coke burn, and post oxychlorination stripping at low (atmospheric) pressure rather than at oxychlorination pressure (175 psia) improves recovery of activity and selectivity. The deactivated catalyst of Example I was regenerated using the following preferred procedure:

The catalyst was coke burned at 450° C. and 175 psia for 10 hours with 0.2 vol. % oxygen in nitrogen. Linear gas velocity was maintained at 0.5 fps for the entire regeneration procedure. The coke burn was completed at 510° C. and 175 psia. The catalyst was oxychlorinated to redisperse platinum by adding 0.15 vol. % HCl to the gas stream flowing into the reactor for 4.5 hours. Then, the catalyst was cooled from 510° C. to 345° C. while continuing the flow of the HCl/oxygen/nitrogen oxychlorination gas mixture. The catalyst was then stripped at 170 psia and 3450 C by passing a gas stream containing 0.87 vol. % oxygen and 0.84 vol. % water vapor in nitrogen through the catalyst. Stripping was completed by cutting off water vapor flow and continuing flow of the oxygen in nitrogen stream at 170 psia and 345° C. for one more hour. Oxygen flow was cut off and nitrogen flow was continued to purge oxygen out of the reactor system. Then the catalyst was reduced by passing 2 vol. % hydrogen in nitrogen at 345° C. and 170 psia through the catalyst for two hours. This regenerated catalyst is catalyst A.

The same deactivated catalyst was regenerated using the preferred procedure of this patent. The catalyst was coke burned at 450° C. and 170 psia with 0.2 vol. % oxygen in nitrogen for 10 hours and then at 510° C. with 3.5 vol. % oxygen for 16 hours. Linear gas velocity through the catalyst was 0.5 fps throughout the regeneration procedure and the inert carrier gas was nitrogen. Oxygen was purged out of the reactor system by continuing nitrogen flow after cutting off oxygen and then the catalyst was reduced with 50% hydrogen in nitrogen at 510° C. for one hour. Hydrogen was purged out of the reactor system by continuing nitrogen flow after cutting off hydrogen and then the catalyst was preconditioned for oxychlorination by treating it with 0.89 vol. % oxygen and 0.87 vol. % water vapor at 510° C. and 175 psia. The catalyst was oxychlorinated to redisperse platinum by adding 0.15 vol. % HCl to the carrier gas stream. The catalyst was stripped at 345° C. at atmospheric pressure with a gas stream containing 5 vol. % oxygen and 0.84 vol. % water vapor for eight hours. Water vapor flow was cut off and the catalyst treated with dry oxygen in nitrogen mixture for two hours. Oxygen was purged out of the system by continuing nitrogen flow for two hours. Finally, the catalyst was reduced at 345° C. with 7 vol. % hydrogen in nitrogen for six hours. This regenerated catalyst is Catalyst B.

Catalyst B exhibited 30% higher activity and selectivity for aromatizing hexane streams to benzene than did Catalyst A.

Example IV

This example illustrates that the efficiency of coke removal is greatly improved when HCl is added into the coke burn gas. A coke-deactivated Pt/KL catalyst (the catalyst used in the examples was 0.64 wt. % Pt supported on potassium zeolite L with alumina binder) discharged from a pilot plant test was used in this example. Two grams of the catalysts were heated to 345° C. under $N_2$. A gas mixture of 3.35% $H_2O$, 10% $O_2$, with the balance being $N_2$ was introduced at 345° C. at 1000 cc/min to burn off the coke. The wet coke burn was continued for 3 hours at 345° C. The catalyst was then treated with 10% $O_2$ in $N_2$ at 345° C. for 1 hour. Dry $N_2$ was introduced into the reactor to purge out $O_2$ at 345° C. for ½ hour. The catalyst was then reduced at 345° C. for 1 hour. This catalyst is designated as Catalyst 4-A. In a separate experiment, two grams of the same sample were burned with the same procedure as that described above except that 0.2% HCl was added into the coke burn gas during the wet burn at 345° C. This catalyst is designated as Catalyst 4-B. The coke analysis of the coke-deactivated catalyst, Catalyst 4-A, and Catalyst 4-B was performed, and the results are tabulated in Table 2. The results show that the amount of coke removal for the coke burn with HCl is about 1.6 times of the case without HCl.

TABLE 2

|  | % Coke Removal |
| --- | --- |
| Coke-deactivated Catalyst | 0 |
| Catalyst 4-A | 39 |
| Catalyst 4-B | 64 |

Example V

This example illustrates that the coke burn temperature can be dramatically reduced when HCl is added during coke burn to achieve same degree of metal dispersion with the subsequent rejuvenation process. A coked catalyst discharged from a pilot plant coking test was used in this example. The coke content of this example is about 1%. Three grams of the catalyst were heated to 345° C. under $N_2$. A gas mixture of 0.2% HCl, 3.35% $H_2O$, 10% $O_2$, with the balance being $N_2$ was introduced into the reactor. The catalyst was burned with this gas mixture at 345° C. for 5 hours, and then was treated with 10% $O_2$ in $N_2$ at 345° C. for 1 hour. The reactor was then purged with $N_2$ for ½ hour, and reduced at 345° C. for 1 hour with pure $H_2$. The catalyst was purged with $N_2$, and the temperature was raised to 510° C. A gas mixture of 0.65% HCl, 2.9% $H_2O$, 20% $O_2$, with the balance being $N_2$ was introduced into the reactor for catalyst rejuvenation. The catalyst was oxychlorinated at 510° C. for 2 hours, and the gas was switched to a wet air containing 2.9% $H_2O$. The catalyst was held at 510° C. for 1 hour, and cooled to 482° C. The reactor was purged with $N_2$ for 1 hour. The catalyst was then reduced at 482° C. with pure $H_2$ for 1 hour. This catalyst was designated as Catalyst 5-A. In a separate experiment, an aliquot of sample was rejuvenated with the same procedure as the described above except that the temperature of the coke burn was raised to 510° C. instead of 345° C. This catalyst is designated as Catalyst 5-B. Hydrogen chemisorption measurements were performed on the fresh catalyst, Catalyst 5-A and Catalyst 5-B, and the results were tabulated in Table 5. The H/Pt value is an indicator of the state of metal dispersion. In general, the higher the H/Pt ratio, the better the metal dispersion, the better the catalyst. When HCl is added during the coke burn, coked catalyst can be regenerated with reducing the coke burn temperature from 510° C. to 345° C.

TABLE 3

|  | H/Pt |
| --- | --- |
| Fresh | 0.7 |
| Catalyst 5-A | 0.67 |
| Catalyst 5-B | 0.65 |

Although the invention as described with reference to particular means, materials and embodiments, from the foregoing description, one skilled in the art can easily ascertain the essential characteristics of the present invention; and various changes and modifications may be made to various usages and conditions, without departing from the spirit and scope of the invention as described in the claims that follow.

What is claimed is:

1. A process for regenerating a deactivated monofunctional, non-acidic reforming catalyst comprising a Group VIII catalytic metal and zeolite L or enhancing the activity of a fresh monofunctional, non-acidic reforming catalyst comprising a Group VIII catalytic metal and zeolite L, said process comprising:

(a) contacting the catalyst with a gaseous stream comprising inert gas and oxygen under oxidation conditions for a time effective to burn coke off the deactivated catalyst to result in a substantially decoked catalyst;

(b) contacting the substantially decoked catalyst with a gaseous stream comprising inert gas, oxygen, water and a source of halogen under oxyhalogenation conditions comprising a temperature of from about 450° C. to about 550° C. and a time effective to halogenate and disperse the metal to result in a halogenated catalyst comprising dispersed halogenated catalytic metal;

(c) contacting the halogenated catalyst with a gaseous stream comprising inert gas and oxygen under halogen removal conditions at a temperature in the range of from about 300° C. to about 400° C., and a total pressure not greater than 65 psia and a time effective to remove from the halogenated catalyst at least some of the halogen from the halogenated catalytic metal and result in a gaseous stream after contact with the catalyst comprising hydrogen halide at a partial pressure of less than about 0.004 psia; and (d) contacting the catalyst of step (c) with a gaseous stream comprising hydrogen under reducing conditions at a total pressure less than 65 psia for a time effective to reduce at least some of the halogenated catalytic metal in the catalyst and result in a regenerated catalyst comprising dispersed metal and zeolite L and a gas flow after contact with the catalyst comprising hydrogen halide at a partial pressure of less than about 0.0075 psia.

2. A process according to claim 1 wherein step (a) is performed under at least one condition selected from the group consisting of a temperature of from 400 to 550° C., a pressure of from sub-atmospheric to 2.07 Mpaa (300 psia), and an oxygen partial pressure not more than 69 Kpaa (10 psia).

3. A process according to claim 1 wherein step (a) is performed for a period of time until the gaseous stream after contact with the catalyst comprises a partial pressure of carbon dioxide of less than 69 Paa (0.01 psia).

4. A process according to claim 1 wherein the gaseous stream in step (a) additionally comprises at least one member selected from the group consisting of water and a source of halogen.

5. A process according to claim 1 wherein step (a) is performed in a first stage and a second stage, wherein (i) the first stage is performed at a lower temperature than the second stage and (ii) the gaseous stream of the first stage has a lower oxygen concentration than that of the second stage.

6. A process according to claim 1 wherein step (b) is performed under at least one condition selected from the group consisting of an oxygen partial pressure not greater than 69 Kpaa (10 psia), a water partial pressure not greater than 20.7 Kpaa (3 psia), and a halogen source partial pressure prior to contact with the catalyst of not less than 138 Paa (0.02 psia) and a total pressure of not more than 2.07 Mpaa (300 psia).

7. A process according to claim 1 wherein in step (b) the gaseous stream after contact with the substantially decoked catalyst comprises a partial pressure of halogen of at least 69 Paa (0.01 psia).

8. A process according to claim 1 wherein step (c) is performed at a total pressure not greater than 690 Kpaa (100 psia).

9. A process according to claim 1 wherein step (c) is performed for a period of time until the gaseous stream after contact with the halogenated catalyst comprises a partial pressure of hydrogen halide of less than 10.3 Paa (0.0015 psia).

10. A process according to claim 1 wherein the gaseous stream in step (c) comprises at least one member selected from the group consisting of water and oxygen at an oxygen partial pressure not greater than 31 Kpaa (4.5 psia).

11. A process according to claim 1 wherein step (d) is performed under at least one condition selected from the group consisting of a temperature of from 300 to 400° C. and a hydrogen partial pressure greater than 103 Paa (0.015 psia).

12. A process according to claim 11, wherein said gaseous stream of step d) comprises water.

13. A process according to claim 1 wherein step (d) is performed at a total pressure not greater than 448 Kpaa (65 psia).

14. A process according to claim 1 wherein in step (a) and step (b) at least a portion of the gaseous stream after contact with the catalyst is recycled to the respective step, and in step (c) and (d) substantially none of the gaseous stream after contact with the catalyst is recycled to the respective step.

15. A process according to claim 1 wherein between steps (a) and (b) there is performed an intermediate reducing step comprising contacting the substantially decoked catalyst with a gaseous stream comprising inert gas and hydrogen under reducing conditions for a time effective to reduce the metal component of the catalyst to the metallic state.

16. A process according to claim 14 wherein said reducing step is performed under at least one condition selected from the group consisting of a hydrogen partial pressure greater than 103 Paa (0.015 psia) and a temperature of from 300 to 550° C. and a total pressure not greater than 2.07 Mpaa (300 psia).

17. A process according to claim 16, wherein said gaseous stream comprises water.

18. A process according to claim 1 wherein between steps (a) and (b) there is performed a catalyst conditioning step comprising contacting the catalyst with a gaseous stream comprising inert gas, oxygen and water under conditions and for a time to saturate the catalyst with water and form a substantially water saturated catalyst.

19. A process according to claim 16 wherein the substantially saturated catalyst has a moisture content in equilibrium with the gaseous stream of said conditioning step.

20. A process according to claim 16 wherein said conditioning step is performed under at least one condition selected from the group consisting of a temperature of from 300 to 550° C., a water partial pressure not greater than 20.7 Kpaa (3 psia), an oxygen partial pressure not greater than 69 Kpaa (10 psia), and a total pressure not greater than 2.07 Mpaa (300 psia).

21. A process according to claim 1 wherein between steps (b) and (c) there is performed a cooling step comprising contacting the oxyhalogenated catalyst of step (b) with a gaseous stream comprising inert gas and oxygen and water and a source of halogen, which gaseous stream is at a temperature effective to reduce the temperature of the catalyst to a value of from 300° C. to 400° C.

22. A process according to claim 1 wherein the reforming catalyst comprises zeolite L comprising a cation selected from the group consisting of potassium and barium as exchangeable cations, a Group VIII catalytic metal comprising platinum present in from 0.05 to 6 wt % of the catalyst, and a binder.

23. A process according to claim 1 wherein the catalyst produced in step (d) has an activity for aromatizing hexanes to benzene in accordance with the test defined in Example 3 hereof, measured in weight percent yield of benzene, which is at least 1.5 wt % greater than the activity of the catalyst before regeneration.

* * * * *

UNITED STATES PATENT AND TRADEMARK OFFICE
CERTIFICATE OF CORRECTION

PATENT NO. : 5,756,414

DATED : DATED: May 26, 1998

INVENTOR(S) : Yao-Jyh Robert Huang, Houston, TX; Shun Chong Fung, Bridgewater; Gary Brice McVicker, Califon. Both of N.J.; Jar-lin Kao; John Francis Walsh, both of Houston, TX; Kenneth Ray Clem, Humble, TX It is certified that error appears in the above-identified patent and that said Letters Patent is hereby corrected as shown below:

ON THE TITLE PAGE, [*]  Notice, line 3, --4,935,819-- should read "4,925,819".

Signed and Sealed this

Eighteenth Day of May, 1999

Attest:

Q. TODD DICKINSON

Attesting Officer

Acting Commissioner of Patents and Trademarks